US011573334B2

(12) United States Patent
Tanaka

(10) Patent No.: US 11,573,334 B2
(45) Date of Patent: Feb. 7, 2023

(54) INFORMATION PROCESSING DEVICE, INFORMATION PROCESSING METHOD, AND PROGRAM

(71) Applicant: SONY CORPORATION, Tokyo (JP)

(72) Inventor: Yu Tanaka, Tokyo (JP)

(73) Assignee: SONY CORPORATION, Tokyo (JP)

( * ) Notice: Subject to any disclaimer, the term of this patent is extended or adjusted under 35 U.S.C. 154(b) by 136 days.

(21) Appl. No.: 17/049,560

(22) PCT Filed: Apr. 26, 2019

(86) PCT No.: PCT/JP2019/017874
§ 371 (c)(1),
(2) Date: Oct. 21, 2020

(87) PCT Pub. No.: WO2019/216261
PCT Pub. Date: Nov. 14, 2019

(65) Prior Publication Data
US 2021/0239854 A1    Aug. 5, 2021

(30) Foreign Application Priority Data

May 10, 2018    (JP) .............................. JP2018-091768

(51) Int. Cl.
    *G01S 19/47* (2010.01)
(52) U.S. Cl.
    CPC .................................. *G01S 19/47* (2013.01)
(58) Field of Classification Search
    None
    See application file for complete search history.

(56) References Cited

U.S. PATENT DOCUMENTS 6,278,945 B1    8/2001 Lin
2001/0020216 A1    9/2001 Lin
(Continued)

FOREIGN PATENT DOCUMENTS

JP    11-281728 A    10/1999
JP    2012-207919 A    10/2012
JP    2017-198531 A    11/2017

OTHER PUBLICATIONS

Jan Skaloud, "Reducing The GPS Ambiguity Search Space By Including Inertial Data", Proceedings of the 11th International Technical Meeting of the Satellite Division of The Institute of Navigation (ION GPS 1998), Nashville, TN, Sep. 1998, pp. 2073-2080.

(Continued)

*Primary Examiner* — Adam R Mott
*Assistant Examiner* — Sandeep A Stanley
(74) *Attorney, Agent, or Firm* — Chip Law Group

(57) ABSTRACT

Even if a cycle slip occurs in which reception of a positioning signal is interrupted, it is not necessary to estimate an integer bias again. A position during previous observation is updated on the basis of observation information from a sensor. The position during current observation is obtained by solving a modified observation equation obtained by applying a periodic function to an observation equation including a double difference of a carrier phase observed from a positioning signal from a satellite and eliminating the integer bias with the updated position as an initial value. For example, while an error in the position updated by the first calculation unit is less than ½ of a carrier wavelength, the second calculation unit solves the modified observation equation with the updated position as the initial value.

8 Claims, 8 Drawing Sheets

(56) References Cited

U.S. PATENT DOCUMENTS

2018/0299273 A1* 10/2018 Cai .................. G01S 17/89
2019/0120973 A1* 4/2019 Martin ............... G01S 19/41

OTHER PUBLICATIONS

Jan Skaloud, "Reducing the GPS ambiguity search space by including inertial data", Proceedings of the 11th International Technical Meeting of the Satellite Division of The Institute of Navigation (ION GPS-98), Sep. 18, 1998, pp. 2073-2080.

Takahashi, et al., "Precise vehicle positioning by integration of single-frequency RTK-GNSS and INS", Proceedings of the 2016 JSME Conference on Robotics and Mechatronics, Article 2P2-07b7, Jun. 8, 2016, 2 pages.

International Search Report and Written Opinion of PCT Application No. PCT/JP2019/017874, dated Jul. 2, 2019, 12 pages of ISRWO.

* cited by examiner

| SIGNAL | CENTER FREQUENCY (MHz) | WAVELENGTH (m) | CARRIER NOISE (m) |
|---|---|---|---|
| L1 | 1575.42 | 0.19 | 0.003 |
| L2 | 1227.60 | 0.24 | 0.004 |
| L5 | 1176.45 | 0.25 | 0.002 |
| WL(L1-L2) | 347.82 | 0.86 | 0.020 |
| WL(L1-L5) | 398.97 | 0.75 | 0.013 |
| WL(L2-L5) | 51.15 | 5.86 | 0.118 |

INFORMATION PROCESSING DEVICE, INFORMATION PROCESSING METHOD, AND PROGRAM

CROSS REFERENCE TO RELATED APPLICATIONS

This application is a U.S. National Phase of International Patent Application No. PCT/JP2019/017874 filed on Apr. 26, 2019, which claims priority benefit of Japanese Patent Application No. JP 2018-091768 filed in the Japan Patent Office on May 10, 2018. Each of the above-referenced applications is hereby incorporated herein by reference in its entirety.

TECHNICAL FIELD

The present technology relates to an information processing device, an information processing method, and a program, and more particularly to an information processing device that performs positioning by a global navigation satellite system (GNSS), and the like.

BACKGROUND ART

Conventionally, a positioning technology is known that performs positioning on the basis of observation information obtained by observing positioning signals (radio waves) from a plurality of satellites that constitutes GNSS. Then, real time kinematic (RTK) positioning is known as one of positioning methods (see, for example, Patent Document 1). In this RTK positioning, a position is calculated from an observation equation including a double difference of a carrier phase and a pseudo distance as observation information.

In this case, a relative position from a reference station is calculated by estimating integer bias existing in the observation equation by using the nonlinear least squares method and further using the integer least squares method, and by solving the observation equation using the estimated value. Here, the estimated value of integer bias obtained during certain observation (during epoch) can be used during subsequent observation as long as the positioning signal is supplemented. However, in a case where a cycle slip occurs in which reception of the positioning signal is interrupted, the integer bias changes, and thus it is necessary to estimate the integer bias again. It takes some time to estimate the integer bias again, and during that time, the position accuracy decreases.

CITATION LIST

Patent Document

Patent Document 1: Japanese Patent Application Laid-Open No. 2017-198531

SUMMARY OF THE INVENTION

Problems to be Solved by the Invention

An object of the present technology is to eliminate the need for estimating the integer bias again even if a cycle slip occurs in which the reception of the positioning signal is interrupted.

Solutions to Problems

A concept of the present technology is
an information processing device including:

a first calculation unit configured to update a position during previous observation on the basis of observation information from a sensor; and a second calculation unit configured to obtain a position during current observation by solving a modified observation equation obtained by applying a periodic function to an observation equation including a double difference of a carrier phase observed from a positioning signal from a satellite and eliminating an integer bias with the updated position as an initial value.

In the present technology, the position during previous observation is updated by the first calculation unit on the basis of the observation information from the sensor. For example, the sensor may be a sensor that constitutes an inertial measurement unit (IMU). The second calculation obtains the position during current observation by solving a modified observation equation obtained by applying a periodic function to an observation equation including a double difference of a carrier phase observed from a positioning signal from a satellite and eliminating an integer bias with the updated position as an initial value. For example, the periodic function may be a trigonometric function.

For example, while an error in the position updated by the first calculation unit is less than ½ of a carrier wavelength, the second calculation unit may solve the modified observation equation with the updated position as the initial value. This makes it possible to solve the modified observation equation efficiently and to obtain the position during current observation with high accuracy. Furthermore, for example, the carrier wave may be a carrier wave obtained by performing wide-lane linear combination on a first carrier wave and a second carrier wave. This makes it possible to increase the allowable position error updated by the first calculation unit.

Furthermore, for example, a third computation unit may be further provided that obtains a position by solving the observation equation including the double difference of the carrier phase and a pseudo distance observed from the positioning signal from the satellite. A first position during the previous observation in the first calculation unit may be obtained by the third calculation unit.

In this way, in the present technology, by solving the modified observation equation obtained by applying the periodic function to the observation equation including the double difference of the carrier phase and eliminating the integer bias, the position during current observation is obtained. This makes it possible to eliminate the need for estimating the integer bias again even if a cycle slip occurs in which the reception of the positioning signal is interrupted. Furthermore, in the present technology, the modified observation equation is solved with the position during the previous observation being updated on the basis of the observation information from the sensor (position sufficiently close to the solution) as the initial value. Therefore, the position during current observation can be obtained with high accuracy.

Effects of the Invention

The present technology makes it possible to eliminate the need for estimating the integer bias again even if a cycle slip occurs in which the reception of the positioning signal is interrupted, and to avoid decrease in position accuracy. Note that advantageous effects described here are not necessarily restrictive, and any of the effects described in the present disclosure may be applied.

BRIEF DESCRIPTION OF DRAWINGS

FIG. 12 is a diagram showing wavelengths of carrier waves of L1, L2, and L5, and wavelengths during wide-lane combination thereof and the like.

FIG. 13 is a block diagram showing a configuration example of a personal computer.

MODE FOR CARRYING OUT THE INVENTION

A mode for carrying out the invention (hereinafter referred to as an embodiment) will be described below. Note that the description will be made in the following order.
1. Embodiment
2. Modification

1. Embodiment

Figure 1:
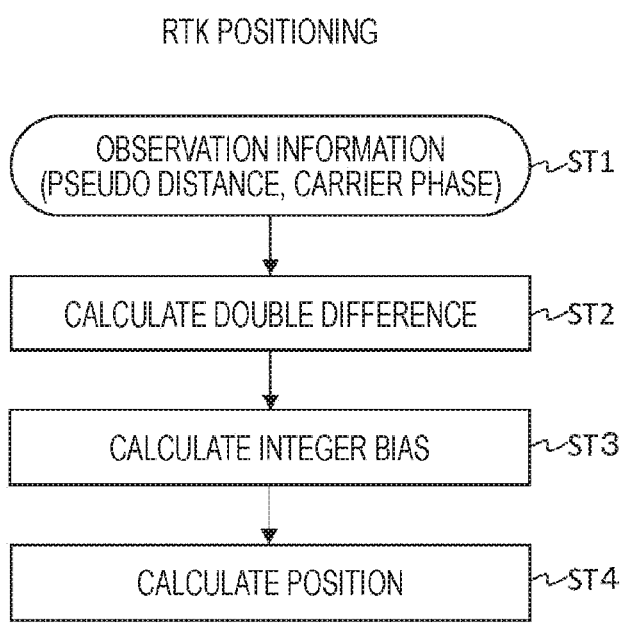
FIG. 1 is a diagram showing one example of a procedure during initial observation (during epoch) in conventional RTK positioning.

First, conventional RTK positioning will be described. FIG. 1 shows one example of a procedure during initial observation (during epoch) in conventional RTK positioning. In step ST1, by observing positioning signals (radio waves) from a plurality of satellites constituting GNSS, observation information required for RTK positioning (pseudo distance, carrier phase) Is acquired.

Figure 2:
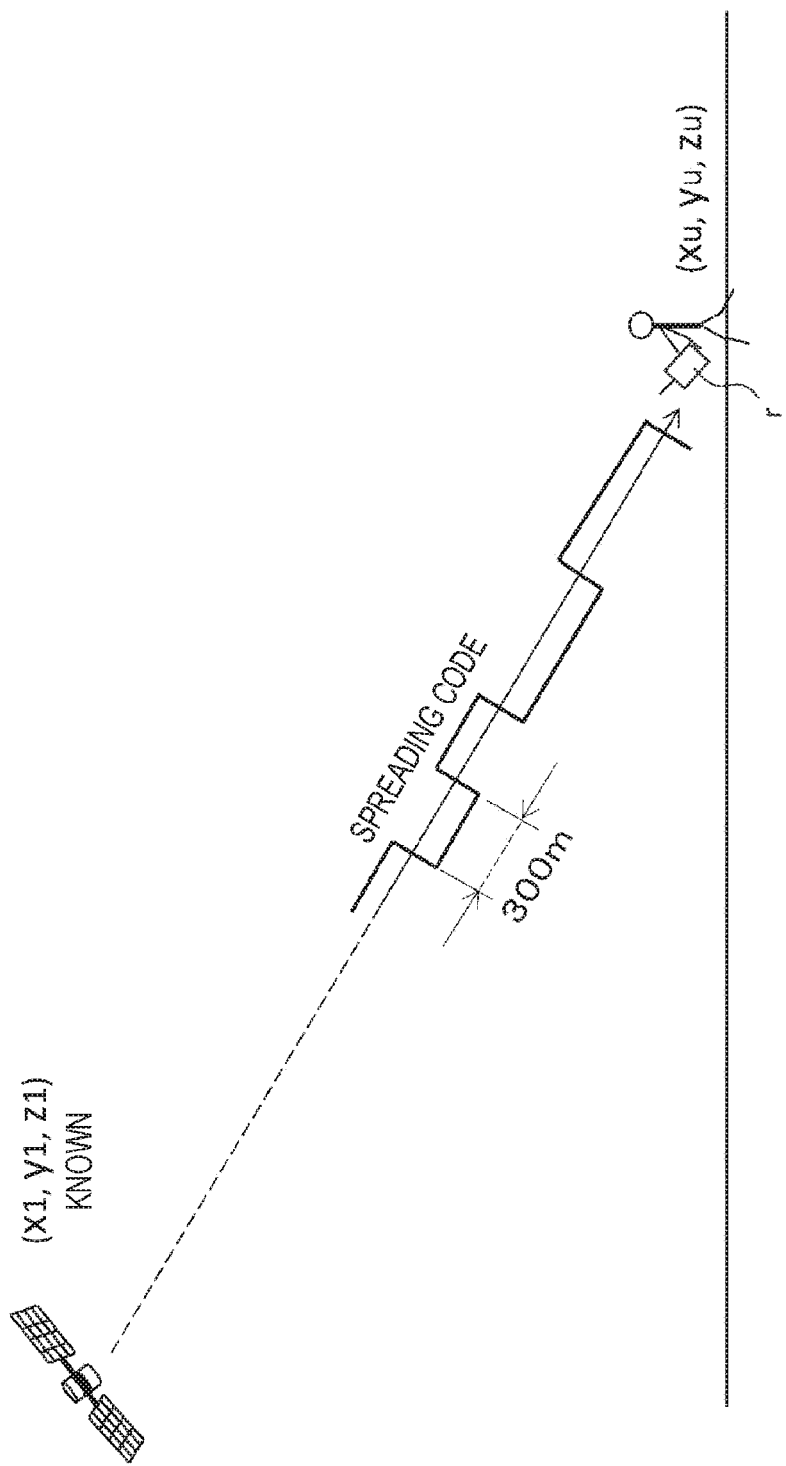
FIG. 2 is a diagram for describing a pseudo distance acquired by a receiver r.

FIG. 2 is a diagram for describing a pseudo distance acquired by a receiver r. (x1, y1, z1) indicates a position of a satellite (known), and (xu, yu, zu) indicates a position of the receiver r. The receiver r obtains the pseudo distance P by multiplying a signal propagation time with the satellite measured by a spreading code (positioning code) included in the positioning signal received from the satellite by the light speed. One chip, which is one unit of the spreading code, is 300 [m].

The pseudo distance P is expressed by mathematical expression (1) below. Here, $\rho$ is a geometric distance (m) between the satellite and the receiver r, c is the light speed (m/s), $\delta t_u$ is a receiver clock error, $\delta t^s$ is a satellite clock error, I is an ionospheric delay (m), T is a tropospheric delay (m), and $\varepsilon_\rho$ is another error.

[Equation 1]

$$P = \rho + c[\delta t_u - \delta t^s] + I + T + \varepsilon_\rho \tag{1}$$

Figure 3:
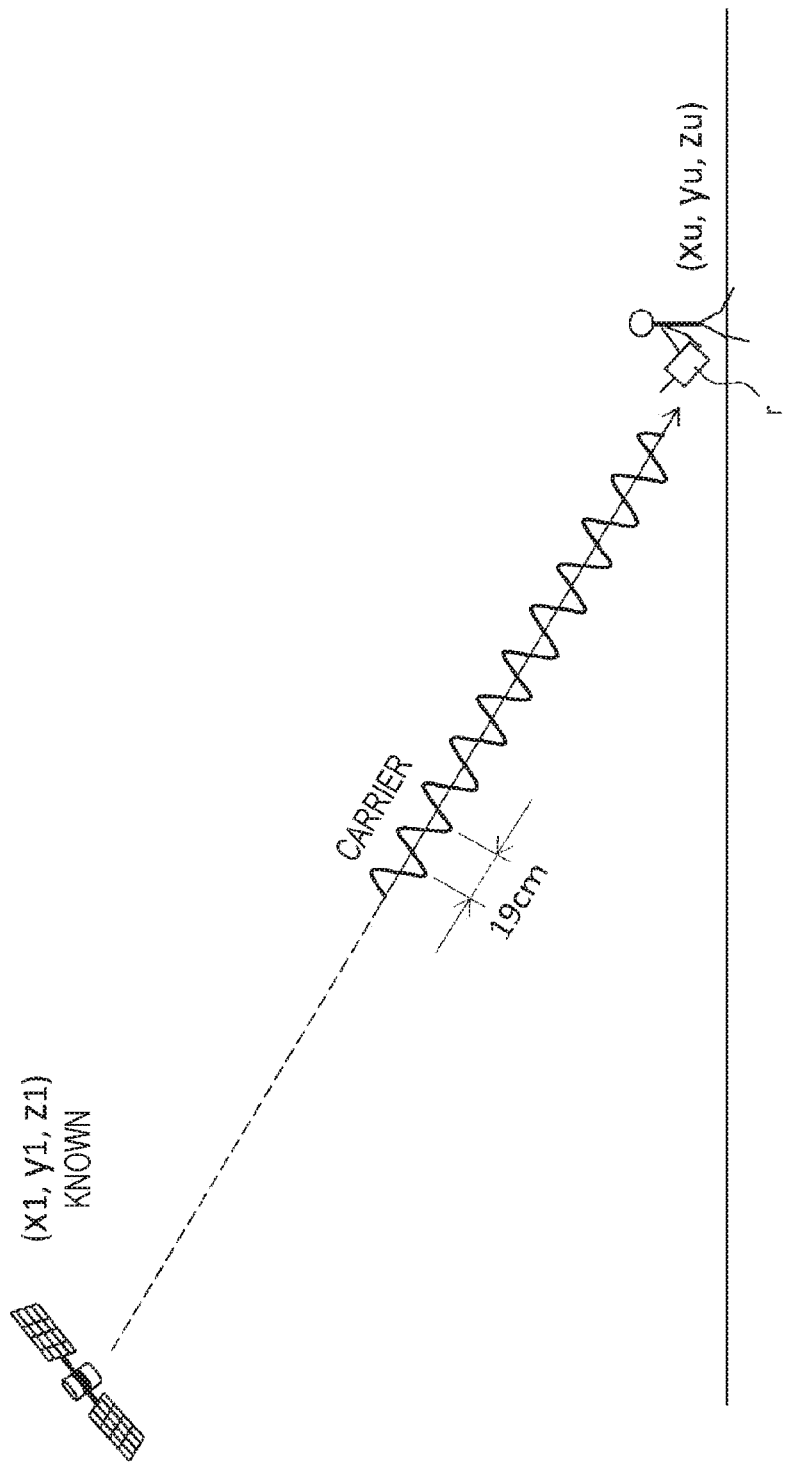
FIG. 3 is a diagram for describing a carrier phase acquired by the receiver r.

FIG. 3 is a diagram for describing the carrier phase acquired by the receiver r. (x1, y1, z1) indicates a position of a satellite (known), and (xu, yu, zu) indicates a position of the receiver r. The receiver r observes the carrier phase cp. Here, for example, for an L1 carrier wave, the frequency is about 1.5 [GHz], and one wavelength, which is one unit of the carrier wave, is 19 [cm].

The carrier phase $\varphi$ is expressed by mathematical expression (2) below. Here, $\rho$ is a geometric distance (m) between the satellite and the receiver r, c is the light speed (m/s), $\delta t_u$ is a receiver clock error, $\delta t^s$ is a satellite clock error, I is an ionospheric delay (m), T is a tropospheric delay (m), $\lambda$ is a wavelength of the carrier wave, B is a phase bias, and $\varepsilon_\varphi$ is another error.

[Equation 2]

$$\Phi = \rho + c[\delta t_u - \delta t^s] - I + T + \lambda B + \varepsilon_\Phi \tag{2}$$

Figure 4:
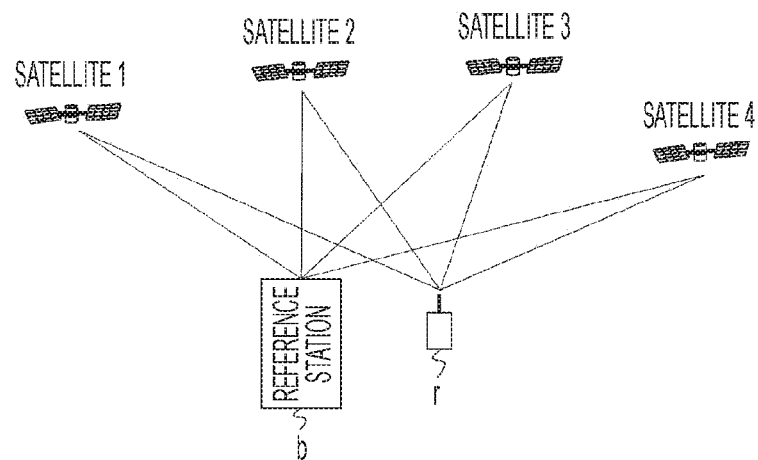
FIG. 4 is a diagram for describing that four satellites or more are required for performing PTK measurement, and that it is necessary to prepare a reference station b whose position is known.

In order to perform RTK measurement, as shown in FIG. 4, four satellites or more are required and it is necessary to prepare a reference station b whose position is known. That is, the number of observations of 16 (=4×2+4×2) is required including observation information between the satellites and the receiver r (pseudo distance, carrier phase), and observation information between the satellites and the reference station b (pseudo distance, carrier phase). Note that actually, as described later, the number of observations is 6 because double difference is taken.

Figure 5:
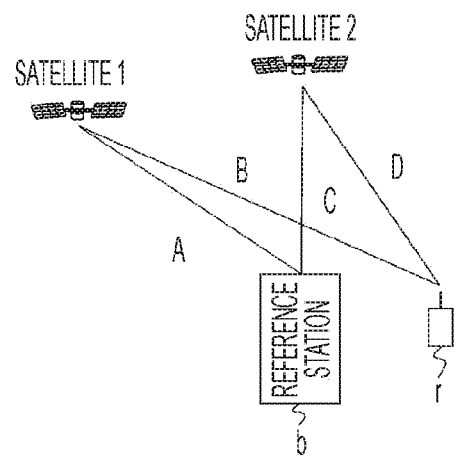
FIG. 5 is a diagram for describing that when calculating a double difference of the pseudo distance and the carrier phase, the double difference is calculated by using observation information of the receiver r and the reference station b related to two satellites 1 and 2.

Returning to FIG. 1, next to step ST1, the double difference of the pseudo distance and the carrier phase is calculated in step ST2. In this case, as shown in FIG. 5, the double difference is calculated by using the observation information of the receiver r and the reference station b related to two satellites 1 and 2. Here, when the observed amount of the reference station b related to the satellite 1 is A, the observed amount of the receiver r related to the satellite 1 is B, the observed amount of the reference station b related to the satellite 2 is C, and the observed amount of the receiver r related to the satellite 2 Is D, then the double difference is calculated as (A−B)−(C−D). The double difference is calculated in order to cancel the clock error of the receiver r, the delay resulted from the atmosphere, and an initial phase bias of the receiver r and the satellites.

Figure 6:
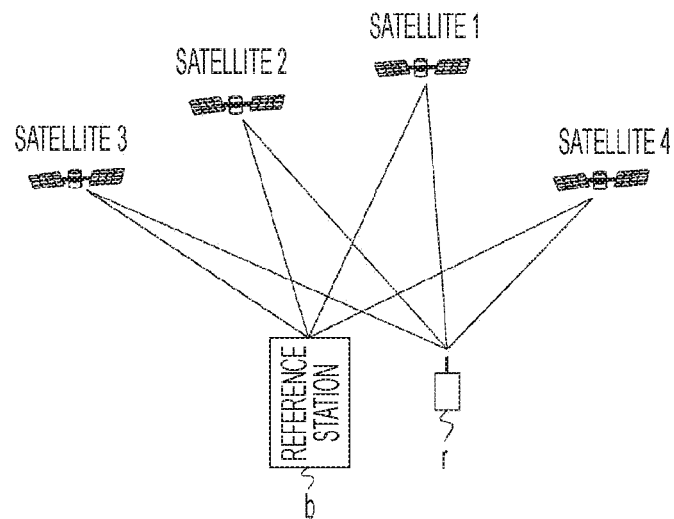
FIG. 6 is a diagram showing that if there are four satellites 1 to 4, for the pseudo distance and carrier phase, six kinds of double difference can be calculated from combination of the satellites.

If there are four satellites 1 to 4 as shown in FIG. 6, for the pseudo distance and carrier phase, six kinds of double difference can be calculated from combination of the satellites. However, usually, the satellite 1 near the zenith is fixed, and the double difference obtained by combining the satellite 1 and the other satellites 2 to 4, that is, three ways of double difference are calculated and used in many cases.

Figure 7:
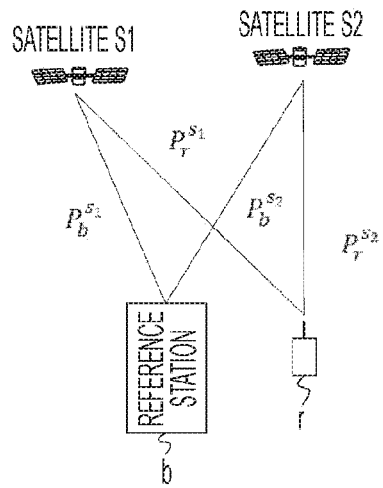
FIG. 7 is a diagram showing the pseudo distances related to the satellites S1 and S2 observed by the reference station b and the receiver r.

FIG. 7 shows pseudo distances related to satellites S1 and S2 observed by the reference station b and the receiver r. The pseudo distance between the satellite S1 and the receiver r is expressed by mathematical expression (3) below. The pseudo distance between the satellite S2 and the receiver r is expressed by mathematical expression (4) below. The pseudo distance between the satellite S1 and the reference station b is expressed by mathematical expression (5) below. The pseudo distance between the satellite S2 and the reference station b is expressed by mathematical expression (6) below.

[Equation 3]

$$P_r^{S1} = \rho_r^{S1} + c[\delta t_r - \delta t^{S1}] + I_r^{S1} + T_r^{S1} + \varepsilon_\rho \quad (3)$$

$$P_r^{S2} = \rho_r^{S1} + c[\delta t_r - \delta t^{S2}] + I_r^{S2} + T_r^{S2} + \varepsilon_\rho \quad (4)$$

$$P_b^{S1} = \rho_b^{S1} + c[\delta t_b - \delta t^{S1}] + I_b^{S1} + T_b^{S1} + \varepsilon_\rho \quad (5)$$

$$P_b^{S2} = \rho_b^{S2} + c[\delta t_b - \delta t^{S2}] + I_b^{S2} + T_b^{S2} + \varepsilon_\rho \quad (6)$$

Therefore, the double difference of the pseudo distance is expressed by mathematical expression (7) below, and the ionospheric delay and the tropospheric delay are canceled.

[Equation 4]

$$P_{rb}^{S_1 S_2} \equiv \left(P_r^{S_1} - P_r^{S_2}\right) - \left(P_b^{S_1} - P_b^{S_2}\right) \quad (7)$$

$$= \rho_{rb}^{S_1 S_2} + \epsilon_{\rho rb}^{S_1 S_2}$$

Figure 8:
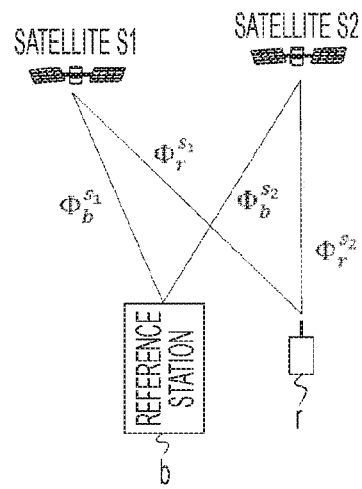
FIG. 8 is a diagram showing the carrier phases related to the satellites S1 and S2 observed by the reference station b and the receiver r.

FIG. 8 shows carrier phases related to the satellites S1 and S2 observed by the reference station b and the receiver r. The carrier phase between the satellite S1 and the receiver r is expressed by mathematical expression (8) below. The carrier phase between the satellite S2 and the receiver r is expressed by mathematical expression (9) below. The carrier phase between the satellite S1 and the reference station b is expressed by mathematical expression (10) below. The carrier phase between the satellite S2 and the reference station b is expressed by mathematical expression (11) below.

[Equation 5]

$$\Phi_r^{S1} = \rho_r^{S1} + c[\delta t_r - \delta t^{S1}] - I_r^{S1} + T_r^{S1} + \lambda B_r^{S1} + \varepsilon_\rho \quad (8)$$

$$\Phi_r^{S2} = \rho_r^{S2} + c[\delta t_r - \delta t^{S2}] - I_r^{S2} + T_r^{S2} + \lambda B_r^{S2} + \varepsilon_\rho \quad (9)$$

$$\Phi_b^{S1} = \rho_b^{S1} + c[\delta t_b - \delta t^{S1}] - I_b^{S1} + T_b^{S1} + \lambda B_b^{S1} + \varepsilon_\rho \quad (10)$$

$$\Phi_b^{S1} = \rho_b^{S1} + c[\delta t_b - \delta t^{S1}] - I_b^{S1} + T_b^{S1} + \lambda B_b^{S1} + \varepsilon_\rho \quad (11)$$

Therefore, the double difference of the carrier phase is expressed by mathematical expression (12) below, and the ionospheric delay and the tropospheric delay are canceled. Furthermore, the phase bias "B" becomes an integer bias "N" by taking a double difference.

[Equation 6]

$$\Phi_{rb}^{S_1 S_2} \equiv \left(\Phi_r^{S_1} - \Phi_r^{S_2}\right) - \left(\Phi_b^{S_1} - \Phi_b^{S_2}\right) \quad (12)$$

$$= \rho_{rb}^{S_1 S_2} + \lambda N_{rb}^{S_1 S_2} + \epsilon_{\rho rb}^{S_1 S_2}$$

Returning to FIG. 1, next to step ST2, the integer bias is calculated on the basis of an observation equation including the double difference of the carrier phase and the pseudo distance in step ST3.

Mathematical expression (13) below shows the observation equation including the double difference of the carrier phase and the pseudo distance.

[Equation 7]

$$\begin{pmatrix} P_{rb}^{12} \\ P_{rb}^{13} \\ P_{rb}^{14} \\ \Phi_{rb}^{12} \\ \Phi_{rb}^{13} \\ \Phi_{rb}^{14} \end{pmatrix} = \begin{pmatrix} \rho_{rb}^{12}(\vec{r}) \\ \rho_{rb}^{13}(\vec{r}) \\ \rho_{rb}^{14}(\vec{r}) \\ \rho_{rb}^{12}(\vec{r}) + \lambda N_{rb}^{12} \\ \rho_{rb}^{13}(\vec{r}) + \lambda N_{rb}^{13} \\ \rho_{rb}^{14}(\vec{r}) + \lambda N_{rb}^{14} \end{pmatrix} + \begin{pmatrix} \epsilon_{\rho rb}^{12} \\ \epsilon_{\rho rb}^{13} \\ \epsilon_{\rho rb}^{14} \\ \epsilon_{\Phi rb}^{12} \\ \epsilon_{\Phi rb}^{13} \\ \epsilon_{\Phi rb}^{14} \end{pmatrix} \quad (13)$$

Note that hereinafter, in order to avoid the complexity of subscripts, the observation equation is expressed using simplified symbols as appropriate, as shown in mathematical expression (14) or mathematical expression (15) below. Note that in mathematical expression (15), (x, y, z) indicates the relative position of the receiver r with respect to the reference station b, and (N1, N2, N3) indicates the integer bias included in the double difference of three carrier phases.

[Equation 8]

$$\begin{pmatrix} P_1 \\ P_2 \\ P_3 \\ \Phi_1 \\ \Phi_2 \\ \Phi_3 \end{pmatrix} = \begin{pmatrix} \rho_1(\vec{r}) \\ \rho_2(\vec{r}) \\ \rho_3(\vec{r}) \\ \rho_1(\vec{r}) + \lambda N_1 \\ \rho_2(\vec{r}) + \lambda N_2 \\ \rho_3(\vec{r}) + \lambda N_3 \end{pmatrix} + \begin{pmatrix} \epsilon_{\rho 1} \\ \epsilon_{\rho 2} \\ \epsilon_{\rho 3} \\ \epsilon_{\Phi 1} \\ \epsilon_{\Phi 2} \\ \epsilon_{\Phi 3} \end{pmatrix} \quad (14)$$

$$\vec{y} = h(\vec{x}) + \epsilon \quad (15)$$

$$\vec{x} \equiv (x, y, z, N_1, N_2, N_3)^T$$

In order to calculate the integer bias, to begin with, the nonlinear least squares method is applied to the observation equation to calculate the integer bias and the relative position. Specifically, for example, solution is attained by the Gauss-Newton method. In this case, initial values of (x, y, z, N1, N2, N3) are set and mathematical expression (16) below is updated until convergence. However, H is expressed by mathematical expression (17) below.

[Equation 9]

$$\vec{x}_{i+1} = \vec{x}_i + (H^T H)^{-1} H^T (y - h(\vec{x}_i)) \quad (16)$$

$$H = \frac{\partial h}{\partial \vec{x}} \Big|_{\vec{x} = \vec{x}_i} \quad (17)$$

In order to determine H, it is necessary to perform differential calculus of the double difference of the geometric distance of the observation equation, which is given by mathematical expression (18) below.

[Equation 10]

$$\frac{\partial \rho_{rb}^{S_1 S_2}}{\partial \vec{r}} = -\vec{e}_r^{S_1 S_2} \equiv -\left(\vec{e}_r^{S_1} - \vec{e}_r^{S_2}\right) \quad (18)$$

$$\vec{e}_r^s \equiv \frac{(x^s - x_r, y^s - y_r, z^s - z_r)^T}{\rho_r^s}$$

By the above nonlinear least squares method, the integer bias is determined as a real solution. Therefore, next, the solution by the nonlinear least squares method is used as the initial value, and the integer least squares method is applied to the observation equation to determine the integer solution of the integer bias value. That is, a solution that satisfies the least square condition is searched for under the constraint that the integer bias is an integer.

As the integer least squares method, for example, the following method (1) or (2) is known.

(1) P. J. G. Teunissen, The least-square ambiguity decorrelation adjustment: a method for fast GPS ambiguity stimation, J. Geodesy, Vol. 70, 65-82, 1995

(2)

X.-W. Chang, X. Yang, T. Zhou, MLAMBDA: A modified LAMBDA method for integer least-squares estimation, J. Geodesy, Vol. 79, 552-565, 2005

Returning to FIG. 1, next to step ST3, the nonlinear least squares method is applied to the observation equation in a state where the integer bias of the calculated integer solution is used in step ST4, and the relative position (x, y, z) is calculated.

Note that during observation after initial observation (during epoch), until a cycle slip occurs in which the reception of the positioning signal is interrupted, the relative position (x, y, z) is calculated by directly using the integer bias of the integer solution calculated as described above in the observation equation based on the new observation information. In a case where the cycle slip occurs, the processing including the processing of calculating the integer bias is performed in a similar manner to the processing during the initial observation described above, and the relative position is calculated.

"Configuration of Receiver"

Figure 9:
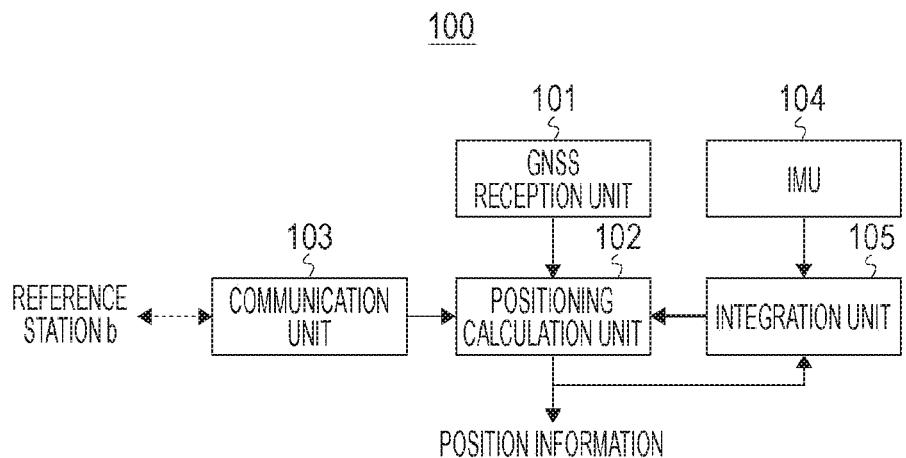
FIG. 9 is a block diagram showing a configuration example of a receiver as an embodiment.

FIG. 9 shows a configuration example of a receiver 100 as the embodiment. The receiver 100 includes a global navigation satellite system (GNSS) reception unit 101, a positioning calculation unit 102, a communication unit 103, an inertial measurement unit (IMU) 104 serving as a sensor, and an integration unit 105.

The GNSS reception unit 101 receives the positioning signals (radio waves) from a plurality of the satellites constituting the GNSS, and supplies the positioning signals to the positioning calculation unit 102. The communication unit 103 receives observation information (pseudo distance, carrier phase) observed by a reference station whose position is known, for example, via the Internet, and supplies the observation information to the positioning calculation unit 102.

The IMU unit 104 includes, for example, a gyro sensor, an acceleration sensor, and the like, and periodically outputs angular velocity and acceleration level in three axes directions as observed values. The integration unit 105 updates the relative position (x, y, z) obtained by the positioning calculation unit 102 by performing integration processing based on observation information of the IMU unit 104, and supplies the updated position to the positioning calculation unit 102.

The positioning calculation unit 102 determines the relative position (x, y, z) by performing processing similar to the conventional RTK positioning described above during the initial observation (during initial epoch). Furthermore, during observation after the initial observation, the positioning calculation unit 102 solves a modified observation equation obtained by applying a periodic function to the observation equation including the double difference of the carrier phase and eliminating the integer bias by the least squares method with the updated position from the integration unit 105 described above as the initial value to determine the relative position (x, y, z). Note that the pseudo distance is not used because an observation error is large.

This embodiment uses a trigonometric function as the periodic function, and uses the modified observation equation with the integer bias eliminated as shown in mathematical expression (19) below.

[Equation 11]

$$\begin{pmatrix} \sin(2\pi\Phi_1/\lambda) \\ \sin(2\pi\Phi_2/\lambda) \\ \sin(2\pi\Phi_3/\lambda) \end{pmatrix} = \begin{pmatrix} \sin(2\pi\rho_1(\vec{r})/\lambda + 2\pi N_1 + v_{\Phi 1}) \\ \sin(2\pi\rho_2(\vec{r})/\lambda + 2\pi N_2 + v_{\Phi 2}) \\ \sin(2\pi\rho_3(\vec{r})/\lambda + 2\pi N_3 + v_{\Phi 3}) \end{pmatrix} \quad (19)$$

$$= \begin{pmatrix} \sin(2\pi\rho_1(\vec{r})/\lambda + v_{\Phi 1}) \\ \sin(2\pi\rho_2(\vec{r})/\lambda + v_{\Phi 2}) \\ \sin(2\pi\rho_3(\vec{r})/\lambda + v_{\Phi 3}) \end{pmatrix}$$

Figure 10:
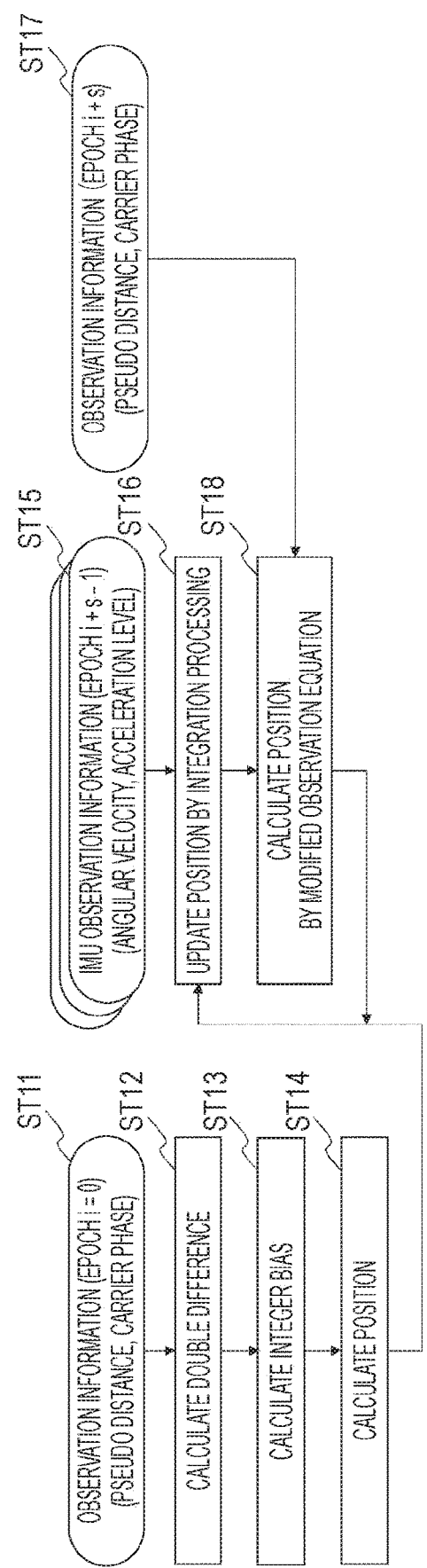
FIG. 10 is a flowchart showing one example of a positioning processing procedure in a positioning calculation unit.

The flowchart of FIG. 10 shows one example of a positioning processing procedure in the positioning calculation unit 102. Note that "s" represents an updating step of the observation information (pseudo distance, carrier phase). In general, among GNSS observation information and IMU observation information, the IMU observation information has higher observation frequency, and thus introduction is made for expression. For example, if s=3, the acquisition frequency of the GNSS observation information and the IMU observation information is as follows.

GNSS observation information: i=0, 3, 6, 9, . . . .

IMU observation information: i=0, 1, 2, 3, 4, 5, 6, 7, 8, 9, . . . .

The processes of steps ST11 to ST14 on the left side show processes at epoch "i=0", and correspond to processes in conventional RTK positioning (see FIG. 1). To begin with, the positioning calculation unit 102 acquires the observation information (pseudo distance, carrier phase) at epoch "i=0" in step ST11. In this case, the observation information (pseudo distance, carrier phase) of the receiver r itself is supplied from the GNSS reception unit 101, and the observation information (pseudo distance, carrier phase) of the reference station b is supplied from the communication unit 103.

Next, the positioning calculation unit 102 calculates the double difference of the pseudo distance and the carrier phase in step ST12 (see mathematical expressions (7) and (12)). Next, in step ST13, on the basis of the observation equation including the double difference of the carrier phase and the pseudo distance (see mathematical expressions (13) and (14)), the positioning calculation unit 102 calculates the integer bias by sequentially applying the nonlinear least squares method and the integer least squares method.

Next, in step ST14, using the integer bias of the calculated integer solution, the positioning calculation unit 102 applies the nonlinear least squares method to the observation equation to calculate the relative position (x, y, z) of the receiver 100 with respect to the reference station b. The relative position (x, y, z) calculated in this way becomes the position information at epoch "i=0".

Furthermore, the processes of steps ST15 to ST18 at the center and on the right side show the processes during and after the initial observation. In step ST15, the positioning calculation unit 102 acquires the IMU observation information (angular velocity, acceleration level). Next, in step ST16, the positioning calculation unit 102 updates the relative position calculated in step ST14 or step ST18 as described later by integration processing based on the IMU observation information acquired in step ST11.

Furthermore, the positioning calculation unit 102 acquires the observation information at epoch "i+s" (pseudo distance, carrier phase) in step ST17. In this case, the observation information of the receiver r itself (pseudo distance, carrier phase) is supplied from the GNSS reception unit 101, and the observation information of the reference station b (carrier phase) is supplied from the communication unit 103.

Next, in step ST18, the positioning calculation unit 102 calculates the double difference of the carrier phase, solves the modified observation equation including the double difference (see mathematical expression (19)) by the non-linear least squares method, with the updated position obtained in step ST16 as the initial value, and determines the relative position (x, y, z). The relative position (x, y, z) calculated in this way becomes position information at epoch "i+s".

Note that as described above, in a case where the relative position (x, y, z) is determined using the modified observation equation, convergence to a correct solution is not attained unless an initial value close enough to the solution is selected. In this case, an error in the updated position obtained in step ST16 (IMU integration error) needs to be smaller than $\lambda/2$. That is, it can be said that the calculation in step ST18 needs to be performed while the IMU integration error is smaller than $\lambda/2$. Note that in a case where the GNSS observation cannot be obtained and the IMU integration error exceeds a threshold, it is possible to conduct a search by setting grid points with a length of about the wavelength and setting each point in the error sphere as the initial value.

As described above, in the receiver 100 shown in FIG. 9, by solving the modified observation equation obtained by applying the periodic function to the observation equation including the double difference of the carrier phase and eliminating the integer bias, the position during current observation (relative position from the reference station b) is obtained. Therefore, it is not necessary to estimate again the integer bias even if the cycle slip occurs in which reception of the positioning signal is interrupted.

Furthermore, in the receiver 100 shown in FIG. 9, the modified observation equation is solved by the least squares method with the position obtained by updating the position during previous observation (during previous epoch) by the integration process based on the IMU observation information (position sufficiently close to the solution) as the initial value. Therefore, the position during current observation (during current epoch) (relative position from the reference station b) can be obtained with high accuracy.

2. Modification

Note that the embodiment has described an example of obtaining the position during current observation by solving the modified observation equation obtained by eliminating the integer bias during observation during and after the initial observation. However, it can be considered to continue to obtain the position during current observation by RTK positioning during observation after the initial observation in a similar manner to the initial observation, and to obtain the position during current observation by using the modified observation equation in a case where RTK positioning fails because the integer bias cannot be correctly determined.

Figure 11:
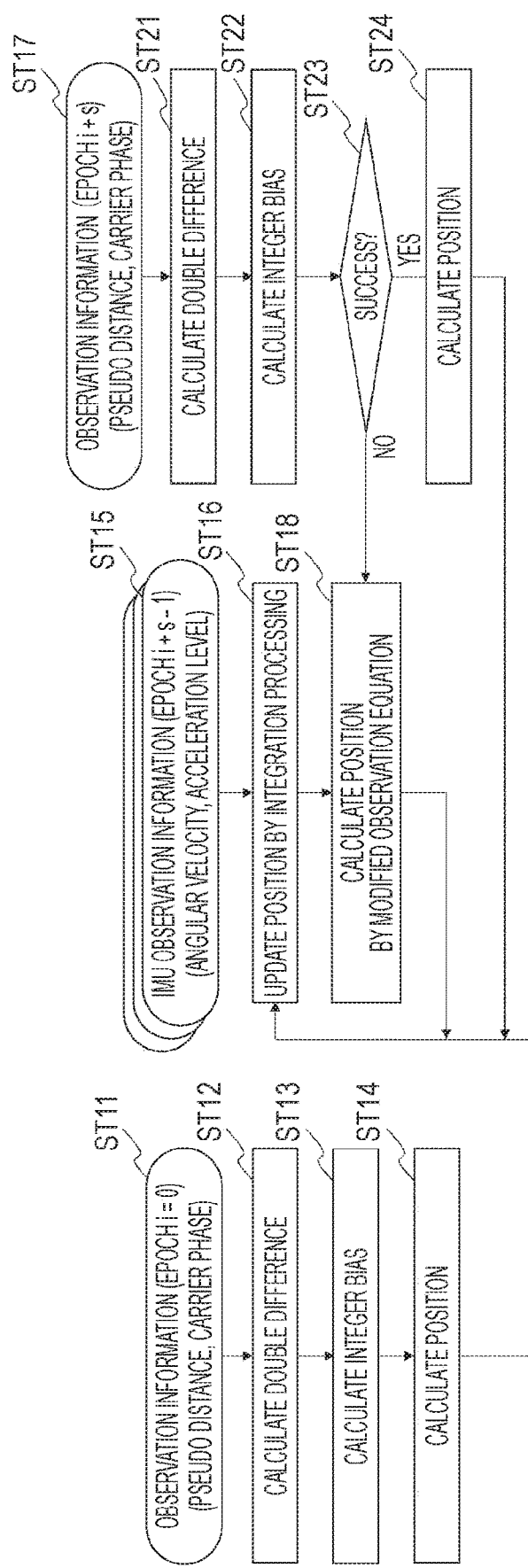
FIG. 11 is a flowchart showing another example of the positioning processing procedure in the positioning calculation unit.

The flowchart of FIG. 11 shows one example of a positioning processing procedure in the positioning calculation unit 102 in that case. In FIG. 11, steps corresponding to the steps of the flowchart of FIG. 10 are denoted with the same reference symbols. Descriptions of the processing of steps ST11 to ST14 during the initial observation will be omitted.

The processing during and after the initial observation will be described. In step ST17, the positioning calculation unit 102 acquires the observation information at epoch "i+s" (pseudo distance, carrier phase). Next, in step ST21, the double difference of the pseudo distance and the carrier phase is calculated (see mathematical expressions (7) and (12)). Next, in step ST22, on the basis of the observation equation including the double difference of the carrier phase and the pseudo distance (see mathematical expressions (13) and (14)), the positioning calculation unit 102 calculates the integer bias by sequentially applying the nonlinear least squares method and further the integer least squares method.

Next, in step ST23, the positioning calculation unit 102 determines whether or not the integer bias has been correctly determined, that is, whether success or not. When success, in step ST24, the positioning calculation unit 102 applies the nonlinear least squares method to the observation equation while using the calculated integer bias of the integer solution, and calculates the relative position (x, y, z) of the receiver 100 with respect to the reference station b. The relative position (x, y, z) calculated in this way becomes position information at epoch "i+s".

On the other hand, when not success in step ST23, the positioning calculation unit 102 proceeds to the process of step ST18. In step ST18, the positioning calculation unit 102 calculates the double difference of the carrier phase, solves the modified observation equation including the double difference (see mathematical expression (19)) by the non-linear least squares method with the updated position obtained in step ST16 as the initial value, and determines the relative position (x, y, z). The relative position (x, y, z) calculated in this way becomes position information at epoch "i+s".

Furthermore, the embodiment has described an example using a trigonometric function as the periodic function. However, the periodic function is not limited thereto, and it is also possible to use an exponential function or a mod function. Here, it is preferable that the function is continuous in a case where a problem is solved by the optimization method. Moreover, in a case where the optimization method requires Jacobian and the like, the function is preferably differentiable at least once. Mathematical expression (20) below indicates one example of the modified observation equation in a case where the exponential function is used. Furthermore, mathematical expression (21) below indicates one example of the modified observation equation in a case where the mod function is used.

[Equation 12]

$$\begin{pmatrix} \exp(-2\pi i \Phi_1/\lambda) \\ \exp(-2\pi i \Phi_2/\lambda) \\ \exp(-2\pi i \Phi_3/\lambda) \end{pmatrix} = \begin{pmatrix} \exp(-2\pi i \rho_1(\vec{r})/\lambda + i\nu_{\Phi 1}) \\ \exp(-2\pi i \rho_2(\vec{r})/\lambda + i\nu_{\Phi 2}) \\ \exp(-2\pi i \rho_3(\vec{r})/\lambda + i\nu_{\Phi 3}) \end{pmatrix} \quad (20)$$

$$\begin{pmatrix} \Phi_1 \bmod \lambda \\ \Phi_2 \bmod \lambda \\ \Phi_3 \bmod \lambda \end{pmatrix} = \begin{pmatrix} (\rho_1(\vec{r}) + \epsilon_{\Phi 1}) \bmod \lambda \\ (\rho_2(\vec{r}) + \epsilon_{\Phi 2}) \bmod \lambda \\ (\rho_3(\vec{r}) + \epsilon_{\Phi 3}) \bmod \lambda \end{pmatrix} \quad (21)$$

Furthermore, as in the embodiment above, in a case where the relative position (x, y, z) is determined using the modified observation equation with the integer bias eliminated, the error in the updated position in the integration unit 105 (IMU integration error) needs to be smaller than λ/2. The allowable integration error of IMU can be increased by observing long-wavelength carrier waves by a method called wide-lane linear combination.

Figures 12, 13:
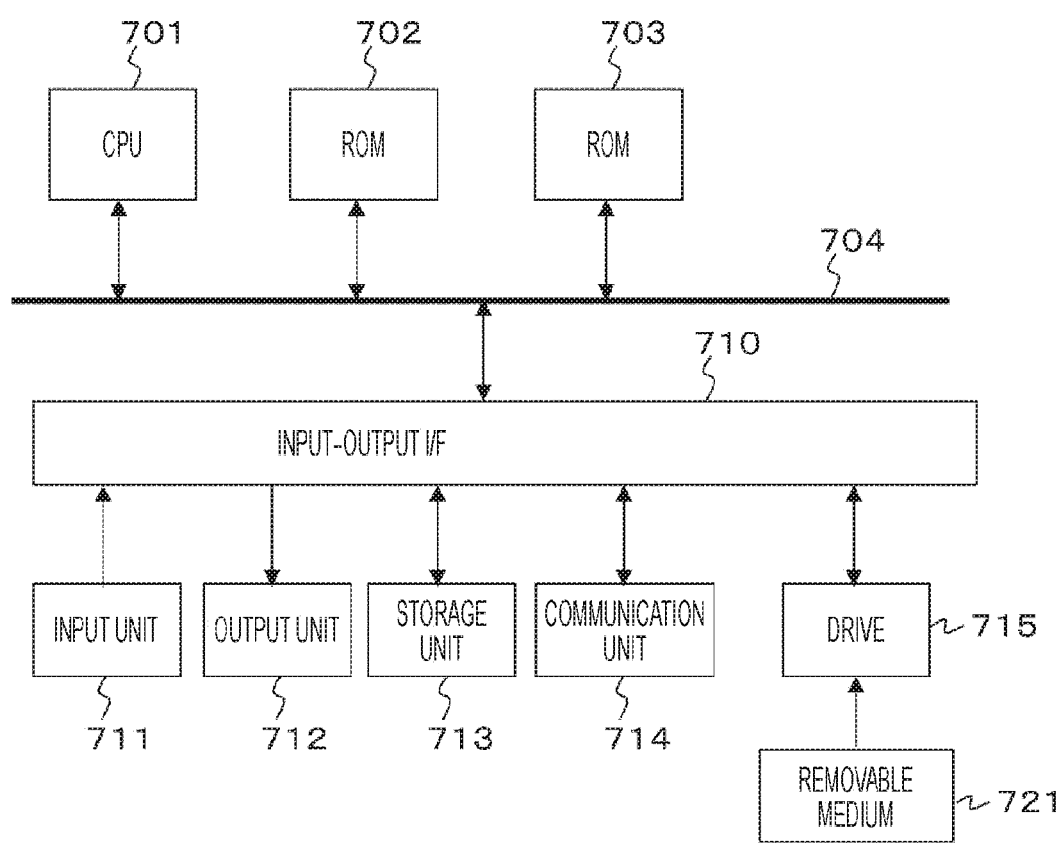

FIG. 12 shows the wavelengths of the carrier waves of L1, L2, and L5, and the wavelengths during wide-lane combination thereof and the like. For example, wide-lane linear combination of an L1 carrier wave (wavelength is 19.0 cm) and an L2 carrier wave (wavelength is 24.4 cm) is given by mathematical expression (22) below, and the wavelength is 86.2 cm as shown by mathematical expression (23) below.

[Equation 13]

$$\frac{\Phi_{L12}}{\lambda_{L12}} = \frac{\Phi_{L1}}{\lambda_{L1}} + \frac{\Phi_{L2}}{\lambda_{L2}} \quad (22)$$

$$\lambda_{L12} = \frac{c}{f_{L1} - f_{L2}} = 86.2 \text{ cm} \quad (23)$$

Furthermore, the above embodiment has described an example of a combination in which the GNSS calculation is RTK and the fusion opponent is IMU, but the combination of the GNSS calculation and the fusion opponent is not limited thereto. For example, a combination of {RTK, PPP, PPP-RTK}×{IMU, RIDAR, SLAM, relocalize} can be considered.

Furthermore, in the above embodiment, the process of each unit of the receiver 100 can be executed by hardware or software. In a case where a series of processes is performed by software, a program constituting the software is installed in a computer. Here, the computer includes a computer embedded in dedicated hardware, and a general-purpose personal computer and the like that can execute various functions by installing various programs.

FIG. 13 shows a configuration example of a personal computer 700. A central processing unit (CPU) 701 performs various types of processing according to a program stored in a read only memory (ROM) 702 or a program loaded from a storage unit 713 to a random access memory (RAM) 703. The RAM 703 also stores data necessary for the CPU 701 to perform various types of processing and the like as needed.

The CPU 701, the ROM 702, and the RAM 703 are connected to one another via a bus 704. An input-output interface 710 is also connected to the bus 704.

An input unit 711 including a keyboard, a mouse, or the like, an output unit 712 including a display such as a cathode ray tube (CRT) or a liquid crystal display (LCD), a speaker, and the like, a storage unit 713 including a hard disk and the like, and a communication unit 714 including a modem and the like are connected to the input-output interface 710. The communication unit 714 performs communication processing via a network including the Internet.

A drive 715 is also connected to the input-output interface 710 as necessary. A removable medium 721 such as a magnetic disk, an optical disk, a magneto-optical disk, or a semiconductor memory is appropriately mounted. A computer program read therefrom is installed in the storage unit 713 as necessary.

Furthermore, the preferred embodiment of the present disclosure has been described in detail above with reference to the accompanying drawings, but the technical scope of the present disclosure is not limited to such an example. It is obvious that persons of ordinary skill in the technical field of the present disclosure can conceive various modifications or alterations within the scope of the technical idea described in the claims, and it is of course understood that these also fall within the technical scope of the present disclosure.

Furthermore, the present technology can also have the following configurations.

(1) An information processing device including:

a first calculation unit configured to update a position during previous observation on the basis of observation information from a sensor; and a second calculation unit configured to obtain a position during current observation by solving a modified observation equation obtained by applying a periodic function to an observation equation including a double difference of a carrier phase observed from a positioning signal from a satellite and eliminating an integer bias with the updated position as an initial value.

(2) The information processing device according to (1) described above, in which the sensor is a sensor constituting an inertial measurement unit.

(3) The information processing device according to (1) or (2) described above, in which the periodic function is a trigonometric function.

(4) The information processing device according to any one of (1) to (3) described above, in which while an error in the position updated by the first calculation unit is less than ½ of a carrier wavelength, the second calculation unit solves the modified observation equation with the updated position as the initial value.

(5) The information processing device according to any one of (1) to (4) described above, in which the carrier wave is a carrier wave obtained by performing wide-lane linear combination on a first carrier wave and a second carrier wave.

(6) The information processing device according to any one of (1) to (5) described above, further including a third computation unit configured to obtain a position by solving the observation equation including the double difference of the carrier phase and a pseudo distance observed from the positioning signal from the satellite, in which a first position during the previous observation in the first calculation unit is obtained by the third calculation unit.

(7) An information processing method including:

updating a position during previous observation on the basis of observation information from a sensor; and obtaining a position during current observation by solving a modified observation equation obtained by applying a periodic function to an observation equation including a double difference of a carrier phase observed from a positioning signal from a satellite and eliminating an integer bias with the updated position as an initial value.

(8) A program for causing a computer to function as:

a first calculation unit configured to update a position during previous observation on the basis of observation information from a sensor; and a second calculation unit configured to obtain a position during current observation by solving a modified observation equation obtained by applying a periodic function to an observation equation including a double difference of a carrier phase observed from a positioning signal from a satellite and eliminating an integer bias with the updated position as an initial value.

REFERENCE SIGNS LIST

100 Receiver
101 GNSS reception unit

102 Positioning calculation unit
103 Communication unit
104 IMU unit
105 Integration unit

The invention claimed is:

1. An information processing device, comprising:
   a first calculation unit configured to update a position during previous observation on a basis of observation information from a sensor; and
   a second calculation unit configured to obtain a position during current observation by solving a modified observation equation obtained by applying a periodic function to an observation equation including a double difference of a carrier phase observed from a positioning signal from a satellite and eliminating an integer bias with the updated position as an initial value.

2. The information processing device according to claim 1, wherein
   the sensor is a sensor constituting an inertial measurement unit.

3. The information processing device according to claim 1, wherein
   the periodic function is a trigonometric function.

4. The information processing device according to claim 1, wherein
   while an error in the position updated by the first calculation unit is less than ½ of a carrier wavelength, the second calculation unit solves the modified observation equation with the updated position as the initial value.

5. The information processing device according to claim 1, wherein
   the carrier wave is a carrier wave obtained by performing wide-lane linear combination on a first carrier wave and a second carrier wave.

6. The information processing device according to claim 1, further comprising
   a third computation unit configured to obtain a position by solving the observation equation including the double difference of the carrier phase and a pseudo distance observed from the positioning signal from the satellite,
   wherein a first position during the previous observation in the first calculation unit is obtained by a third calculation unit.

7. An information processing method, comprising:
   updating a position during previous observation on a basis of observation information from a sensor; and
   obtaining a position during current observation by solving a modified observation equation obtained by applying a periodic function to an observation equation including a double difference of a carrier phase observed from a positioning signal from a satellite and eliminating an integer bias with the updated position as an initial value.

8. A non-transitory computer-readable storage medium storing a program that when executed by a computer, causes the computer to function as:
   a first calculation unit configured to update a position during previous observation on a basis of observation information from a sensor; and
   a second calculation unit configured to obtain a position during current observation by solving a modified observation equation obtained by applying a periodic function to an observation equation including a double difference of a carrier phase observed from a positioning signal from a satellite and eliminating an integer bias with the updated position as an initial value.

* * * * *